Dec. 2, 1924.

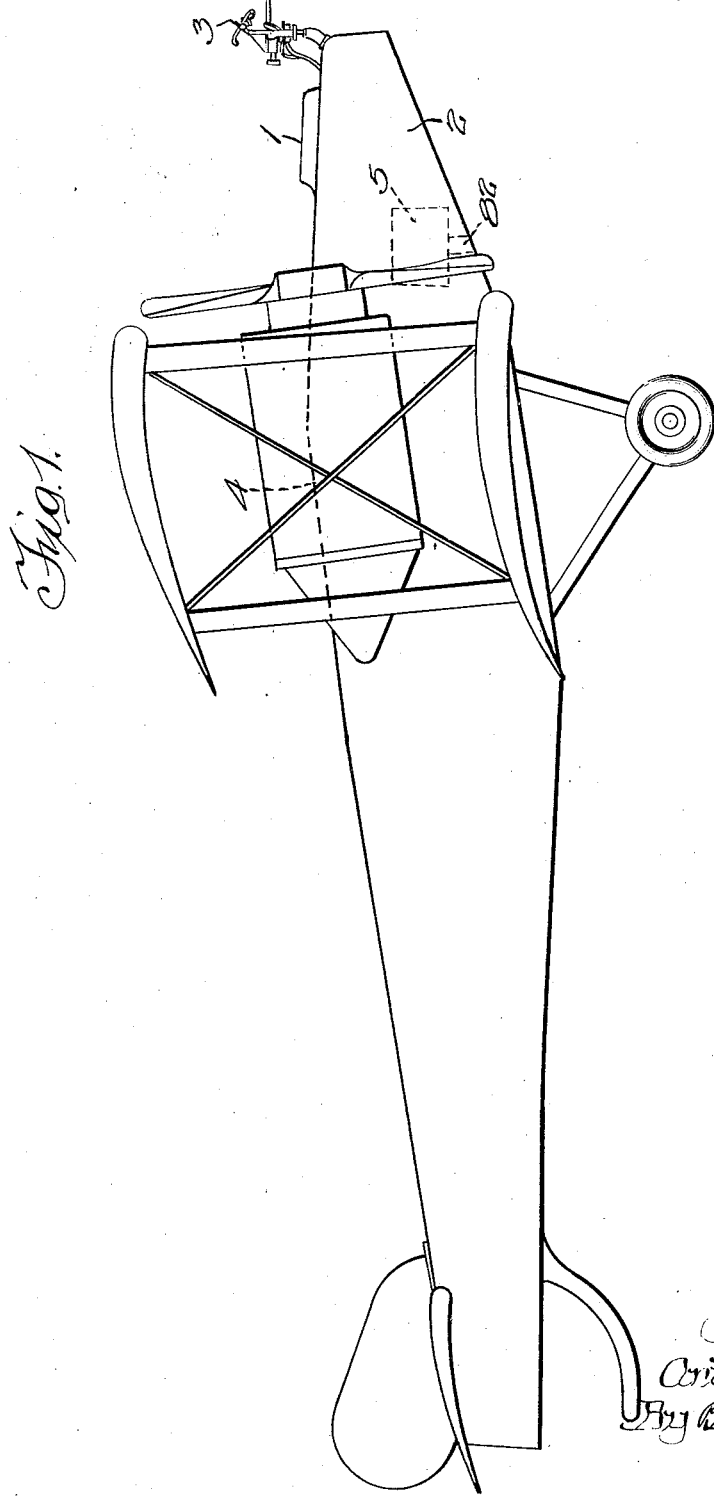

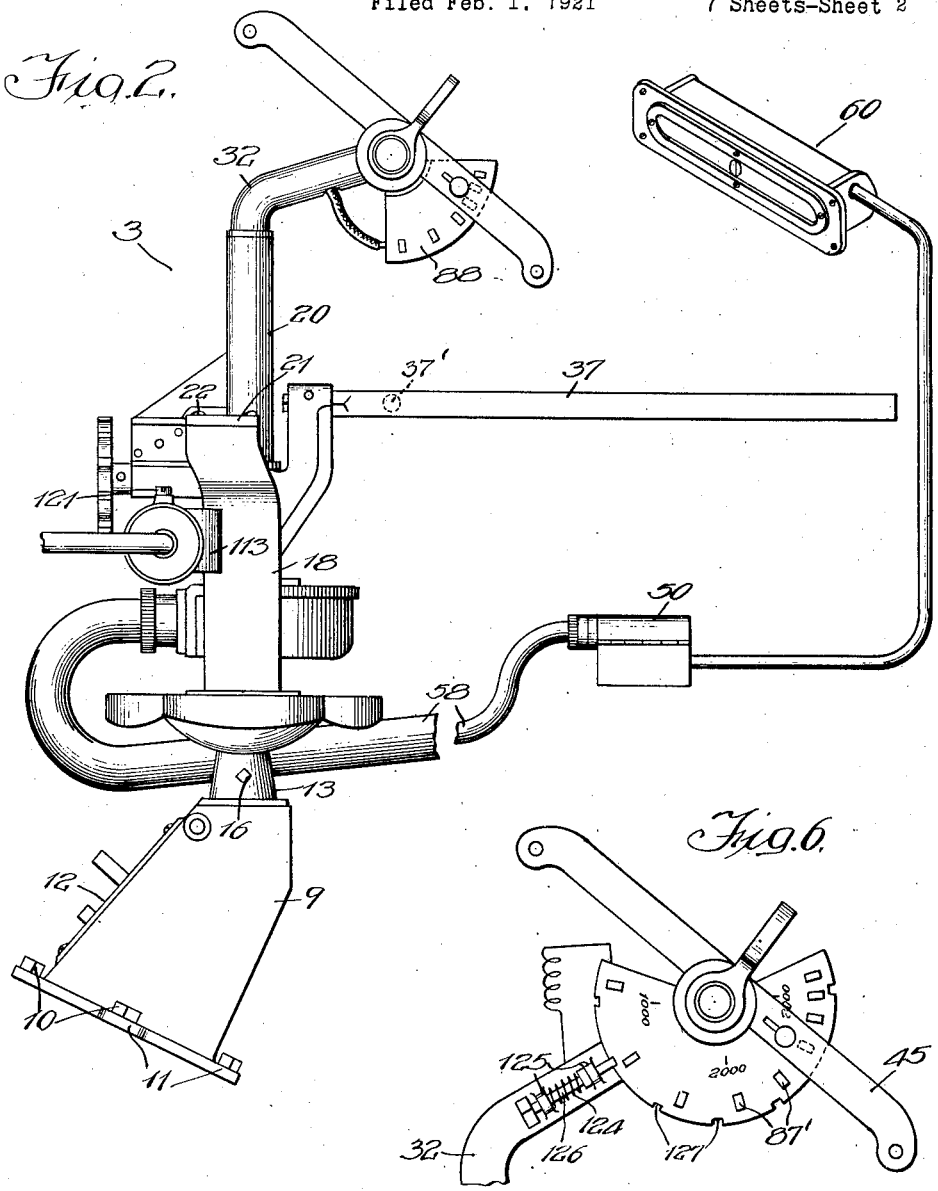

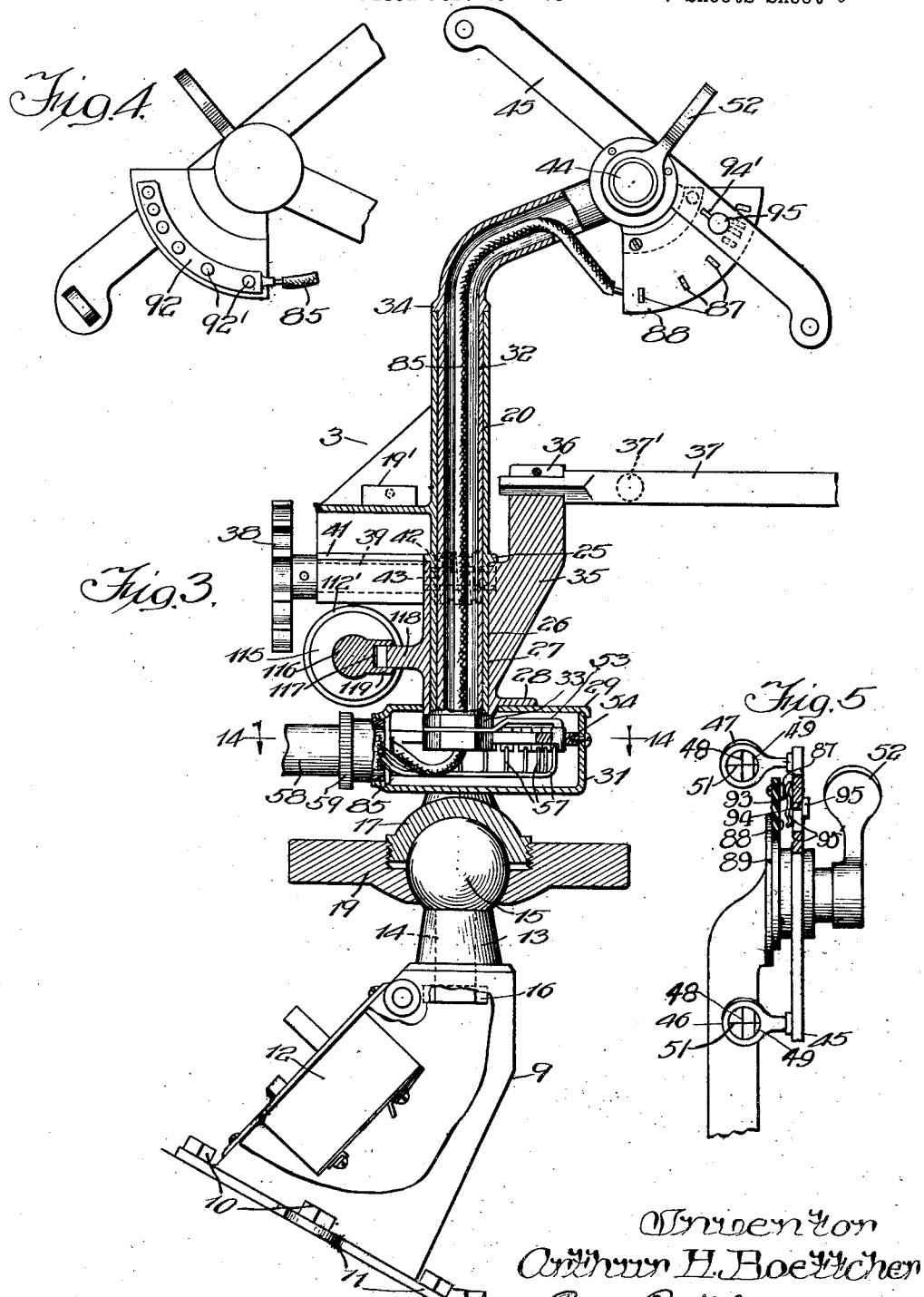

A. H. BOETTCHER

AERIAL PHOTOGRAPHY

Filed Feb. 1, 1921

Inventor
Arthur H. Boettcher
By Brown, Boettcher & Kiemer
Attorneys

Dec. 2, 1924.  1,517,529
A. H. BOETTCHER
AERIAL PHOTOGRAPHY
Filed Feb. 1, 1921  7 Sheets-Sheet 6

Inventor
Arthur H. Boettcher
By Brown, Boettcher & Kiemer
Attorneys

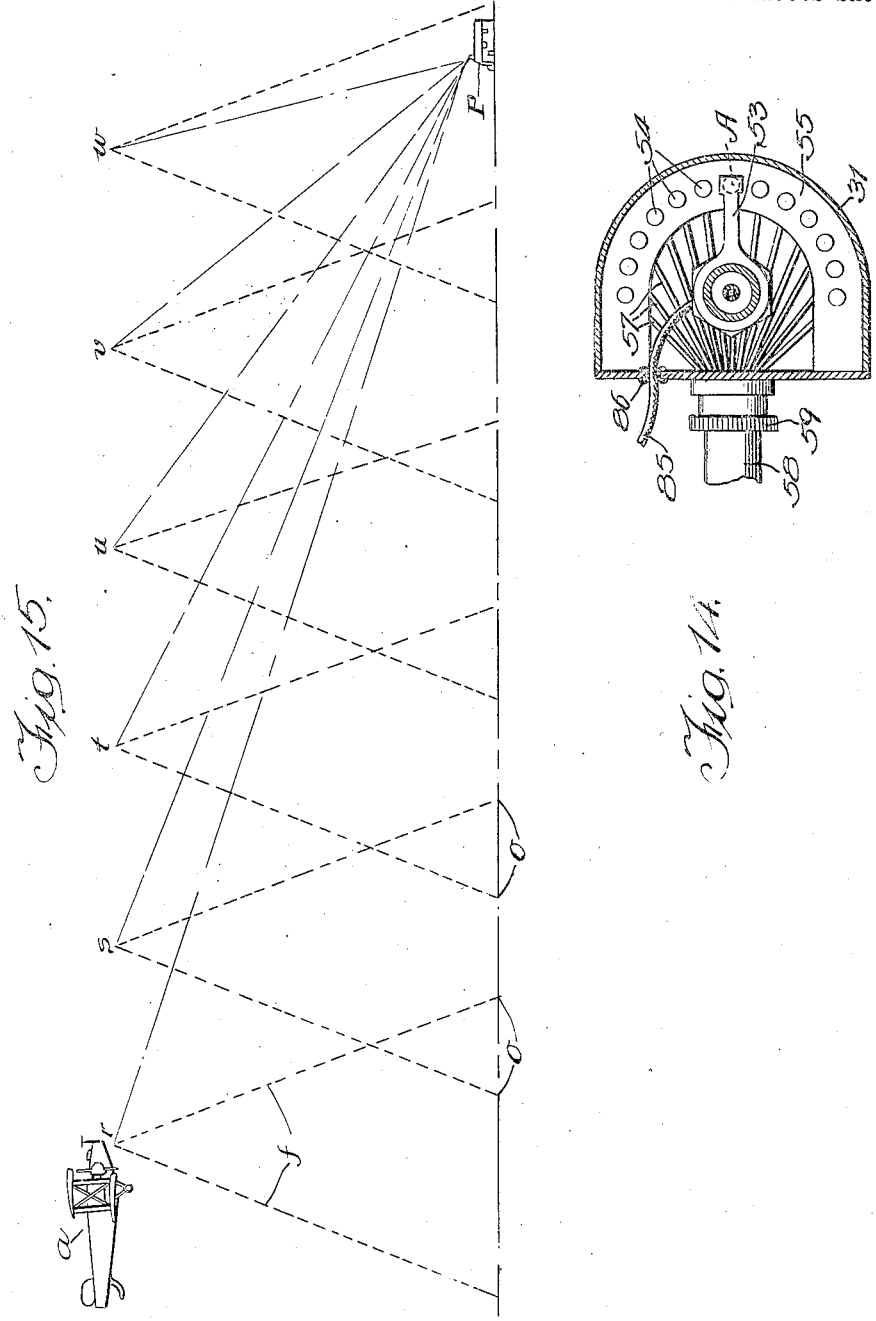

Patented Dec. 2, 1924.

1,517,529

UNITED STATES PATENT OFFICE.

ARTHUR H. BOETTCHER, OF CHICAGO, ILLINOIS.

AERIAL PHOTOGRAPHY.

Application filed February 1, 1921. Serial No. 441,642.

*To all whom it may concern:*

Be it known that I, ARTHUR H. BOETTCHER, a citizen of the United States, residing at Chicago, in the county of Cook and State of Illinois, have invented a certain new and useful Improvement in Aerial Photography, of which the following is a full, clear, concise, and exact description, reference being had to the accompanying drawings, forming a part of this specification.

The present invention relates to aerial photography and is particularly concerned with an improved method of and means for accurate and efficient photography from air craft. The invention is fundamentally concerned with the geometrical problems involved in the practice of aerial photography, such as the accurate determination of the field of exposure and the line of a series of exposures, the accurate alignment of the camera itself relative thereto, and the determination of accurate timing intervals between successive exposures.

My invention is concerned with that kind of aerial photography wherein the camera is mounted upon or in the aircraft, directed downwardly, and wherein the craft is maneuvered over that part of the terrain below of which pictures are desired. It is difficult, however, even at comparatively low altitudes, to determine if the line of flight of the aircraft is accurately over the objective, particularly when a series of pictures are taken to " cover " the objective. With a view to overcoming these difficulties and to insure accurate flight over or toward an objective, I have provided in combination with the craft and camera a directing feature which, by establishing accurate cooperation between the photographer and the pilot, functions to direct the line of flight accurately towards an objective or over it, irrespective of side winds. By the provision of this directing feature, the camera can be made to follow accurately an objective, such as a railroad, a winding stream, a shore-line, etc., or to take a series of pictures in a straight line toward a given point, as in mapping. In this connection it is of importance to point out that this result is secured without disturbing the necessarily constant position of the vertical axis of the camera, as is the case where the pilot must dip or bank in order to see the objective below and by this means maneuver into position.

My invention also provides means for automatically maintaining the horizontal axis of the camera in accurate coincidence with the actual line of flight of the aircraft over the ground, irrespective of any angle which the keel of the aircraft may assume relative to its own course as in the case of a side wind. The desirability for this alignment of the camera will perhaps be more apparent by considering the effect of the lack of it in a specific instance; assume that a strong wind is blowing across the desired line of flight, which necessitates the aircraft heading into the wind at a considerable angle in order to maintain its course of flight over the desired objective. It will be apparent that the result will be that the objective will appear diagonally on each photograph, causing difficulty and waste in producing a " mosaic." It is opportune here to refer briefly what may be termed " mosaic " photography because of the fact that it results in a composite photograph made up of a number of small photographs " patched " together. For the aerial mapping of a railroad, highway, shore line, or other narrow section of the terrain, successive pictures are taken, preferably with a definite amount of " overlap " between them, and this entire series of pictures is then accurately matched to produce a large, composite picture. In the mosaic mapping of a large expanse of the terrain, in the nature of an aerial panorama, or bird's-eye view, a plurality of adjacent parallel series of successive photographs are taken, as above described, until the entire expanse has been covered, these individual photographs being preferably made to overlap slightly in both dimensions, so that they may be readily and accurately matched for the composition of the ultimate picture.

It will be noted that in all these cases it is imperative that the " line of flight " be accurately maintained, in the case of a railroad, etc., accurately following it wherever it goes, and in the case of mapping accurately maintaining a straight line flight to a given point ahead. It is for the purpose of maintaining this " line of flight " factor absolutely accurate that the directing device hereinbefore referred to is provided, this device permitting the pilot to keep the plane level, both fore-and-aft and athwartships, at all times, while at the same time maintaining proper direction of flight. It will also be noted that in the preceding methods of aerial photography, it is desirable that the horizontal axis of the camera be maintained in parallel alignment with the actual course of flight over the ground, and this is taken care of through a ground direction bar which represents the actual course of flight over the ground and controls the angular position of the camera.

A further consideration in connection with the making of successive pictures is the necessity of timing the exposures and the desirability of providing for a predetermined degree of overlap between successive pictures, and another object of the present invention is to provide an exposure mechanism which will automatically determine the proper timing intervals between successive exposures.

My entire apparatus, in simple and compact form is placed under the control of an observer whose duties are concerned entirely with the directing of the craft over the objective and the proper handling of the camera. The necessity of having an observer to perform these duties is manifest, because of the impracticability of having the pilot perform them, owing to the fact that the pilot cannot see the terrain below without dipping or banking, either of which absolutely negatives accurate photography, and cannot have an accurate eye to the objective below and also give proper attention to his instrument board. The duties of the pilot are by the use of the present invention, concerned entirely with maintaining a uniform altitude, keeping the machine level, fore-and-aft and athwartships, and by steering according to the indicator on his instrument board, "flying the line" with accuracy. All these are essential to accurate photography.

It will be understood that the above reference to methods of aerial photography are made for the purpose of emphasizing the utility of the present invention, and is not intended as defining all existing and future modes of practicing the art which, at present, is in its early stages.

In the accompanying drawings, wherein I have illustrated a preferred embodiment of my invention, Figure 1 is a side elevational view of a bow-cockpit type of aeroplane illustrating my improved apparatus mounted thereon;

Figure 2 is a side elevational view of the directing and camera control device which is manipulated by the observer, this view also illustrating in schematic form the connection of the directing and control device with the direction indicating instrument for the pilot.

Figure 3 is a vertical sectional view of the directing and camera control device;

Figure 4 is a fragmentary elevation view of part of the automatic exposure mechanism, as viewed from the other side of Figure 3;

Figure 5 is an edge view of the sight bar, part of the same being broken away to illustrate the arrangement of the contact button.

Figure 6 is a fragmentary elevational view of a modified form of automatic exposure mechanism;

Figure 14 is a horizontal sectional view through the commutator housing on the observer's directing device, being taken on line 14—14 of Figure 3, and Figure 15 is a diagrammatic view representing geometrically the function and operation of the automatic exposure mechanism.

Figure 7:
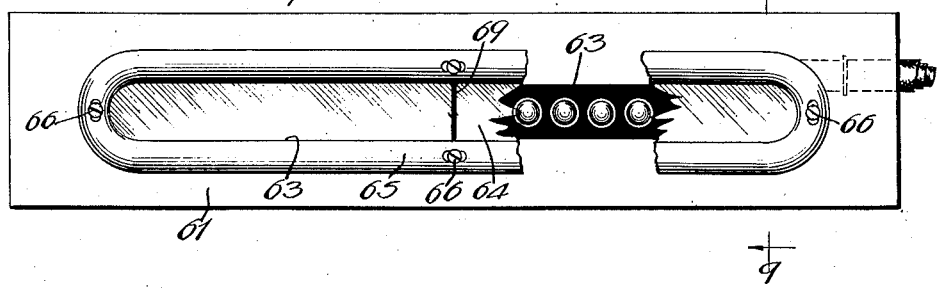
Figure 7 is a front elevational view of the direction indicating instrument which is mounted on the instrument board in the pilot's cock-pit.

In Figure 1 I have shown my improved photographic apparatus embodied in a "bombing" plane of the twin motor type, wherein the observer occupies a bow cockpit 1. For photographic work such type of machine is preferable for the reason that the bow cockpit disposes the observer in a clear, unobstructed position where he may view the entire horizon and the terrain below the machine. It will be understood, however, that the present apparatus may be embodied in other types of machines as well, such for example, as in a single engine tractor type of machine, in which case the observer is located in the rear cockpit, getting his observations over the side, a portion of the wing surface adjacent the fuselage being removed to afford an unobstructed view of the terrain below.

Located no the extreme bow of the fuselage 2 and in position for operation by the observer, is the aerial directing and camera control device 3 by which the observer is enabled to transmit accurate indications to the pilot in the cockpit 4, so that the course of flight of the machine will be accurately maintained toward or over the objective to be photographed. The camera 5 is preferably disposed in the lower part of the fuselage 2 at a point slightly in rear of the observer's cockpit 1, with its lenses directed downwardly, being arranged to be accessible to the observer in order that the films or plates may be changed and adjustments made. The camera occupies a definite relation to the plane.

Referring first to the detail construction of the pilot directing sight 3, as shown in Figures 2 and 3 it will be seen that the sight is adapted for mounting on the bow by means of a bow bracket 9 which is secured to the bow by means of bolts 10 passing through the base lugs 11. This bow bracket is hollow, and the electric switch 12, which will be hereinafter referred to, is mounted therein. The bow bracket terminates at the top in a tubular portion 13, which receives a stem 14 of a ball 15 comprising part of a ball and socket joint. This stem 14 is clamped in place by means of a nut 16. The socket of the ball and socket joint is formed by the base 17 of a yoke 18 and by a ball nut 19 which is screwed down on the base and which may be tightened to form a proper friction hold within the ball and socket joint, permitting a limited universal adjustment of the sight. A level 19' is provided so that the observer may keep the sight level.

Figure 13:
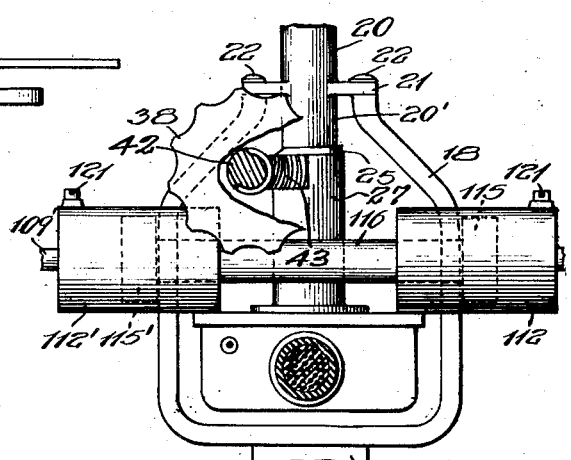
Figure 13 is a fragmentary rear elevational view of the camera control mechanism.

At the top of the yoke 18, a sleeve 20 is secured, through the intervention of the base 21 and screws 22—22 (Figure 13). Extending below the base 21 and co-extensive with the sleeve 20 is a sleeve portion 20' the lower end of which is flanged as indicated at 25 and is formed with a journal portion 26 for receiving an outer rotatable sleeve 27. The sleeve 27 is provided with a flange 28 adjacent its lower end, which flange is screwed to the cover 29 of a commutator housing 31. The sleeve 27 and commutator housing 31 are supported on the journal portion 26 by an inner sleeve or hollow stem 32, which extends down through the upper sleeve 20. This inner sleeve is extended into the commutator housing 31 and has its end threaded to receive a nut 33, by which the housing 31 and sleeve 27 may be drawn up snugly against the flange 25. The hollow stem 32 is provided with a flange 34 adjacent its upper end for bearing upon the top of the upper sleeve 20.

On the forward side of the outer rotatable sleeve 27 is formed an upwardly extending bracket 35, which is split at its upper end to form a clamp 36 for rigidly supporting a horizontally extending drift or ground direction bar 37. This drift bar is adapted to be angularly adjusted in azimuth so as to lie parallel to the direction of actual flight over the ground. The angular adjustment of the bar is effected by a hand wheel 38 at the rear of the sight. The wheel 38 is mounted on a shaft 39 which is journaled in a hub 41 formed integral with the sleeve 20 and base 21. The shaft 39 is offset laterally relatively to the vertical axis of the sight, (Figure 13) and at its end carries a worm gear 42. This worm bears against the forward end of the hub 41, and meshes with the teeth of a segmental worm wheel 43, which is formed integral on the upper end of the outer drift bar sleeve 27. By virtue of the irreversible action of the worm 42, it will be apparent that while the drift bar can be freely adjusted to either side, after it has been once adjusted it will be rigidly maintained in such adjusted position against the turning influence of the inner stem 32 or the vibration of the machine.

Above the sleeve 20 the stem 32 is curved forwardly to support a pivot pin 44, upon which is mounted the object-following sight bar 45. This sight bar has a rear ring sight 46 and a front ring sight 47 in which vertical cross hairs 48 and 49 and a horizontal cross hair 51 are provided. The sight bar 45 is manipulated by a hand piece 52, which is rigidly fastened to the side of the bar. It will be observed that the object-following sight bar 45 has universal movement; its movement in the vertical plane being about the pivot pin 44; and its movement in azimuth being about the axis of the stem 32.

The angle in azimuth between the drift bar 37 and the sight bar 45 is transmitted to commutator mechanism in the housing 31 through the medium of the stem 32, this commutator mechanism functioning to transmit the directional signal to the pilot, as I shall now describe. Rigidly mounted on the lower end of the stem 32, within the housing 31, is a contact brush 53, which is adapted to contact with a semi-circular series of contacts 54 arranged within the casing 31 (see Figure 14). These contacts are secured in a semi-circular insulating piece 55, which is secured in the semi-circular formation of housing 31. There are preferably 19 of these contacts 54, spread over one hundred and eighty degrees with the center contact occupying exactly the center position with respect to the housing 31. The relation of the parts is such that when the object-following sight bar 45 is parallel to the drift bar 37 the brush arm 53 will lie on the center contact 54, which is indicated specifically by the letter "A." Since the contacts 54 and the insulating piece 55 which comprise the commutator, are mounted rigidly in the casing 31, and since the casing 31 is rigidly connected with the drift bar 37 through the outer sleeve 27, it will be clear that whatever be the assumed position of the drift bar, the center contact "A"

will be engaged by the brush arm when the object-following sight bar 45 is parallel to the drift bar 37. The significance of this in the operation of the apparatus will be hereinafter apparent. The contact members 54 are connected independently and respectively to the conductors 57 of the cable 58. The cable 58 is extended from the rear of the commutator housing 31 through a suitable coupling 59. From the pilot directing sight the cable 58 is extended back to the pilot's cockpit 4, where it has connection with the direction indicating instrument 60 which is mounted on the instrument board in the pilot's cockpit. A multiple plug and socket connection 50 (Figure 2) may be interposed in the cable 58 to permit of the ready connection and disconnection of the observer's directing and control instrument 3 from the pilot's direction indicating instrument 60.

Figure 8:
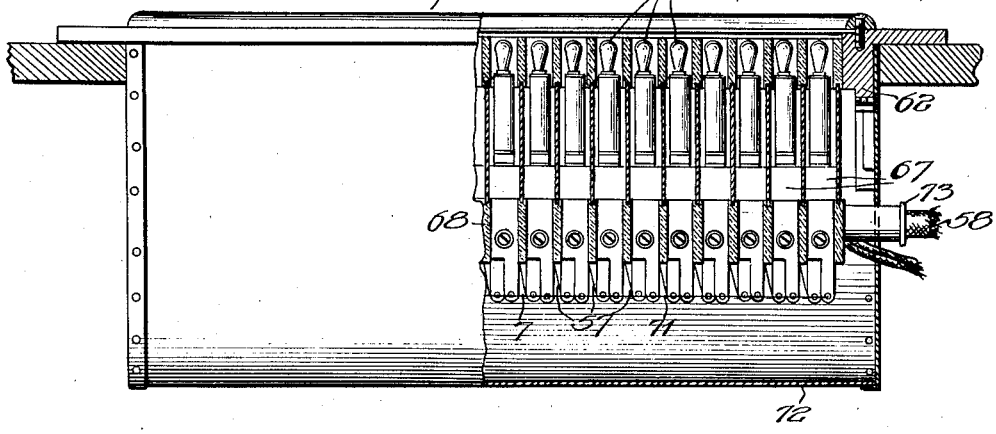
Figure 8 is a plan view, partly in section of the above direction indicating instrument.
Figure 9:
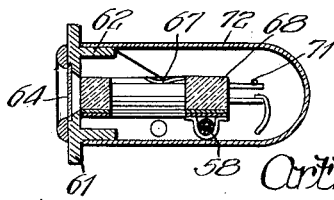
Figure 9 is a transverse sectional view taken on the plane of the line 9—9 of Figure 7.
Figure 12:
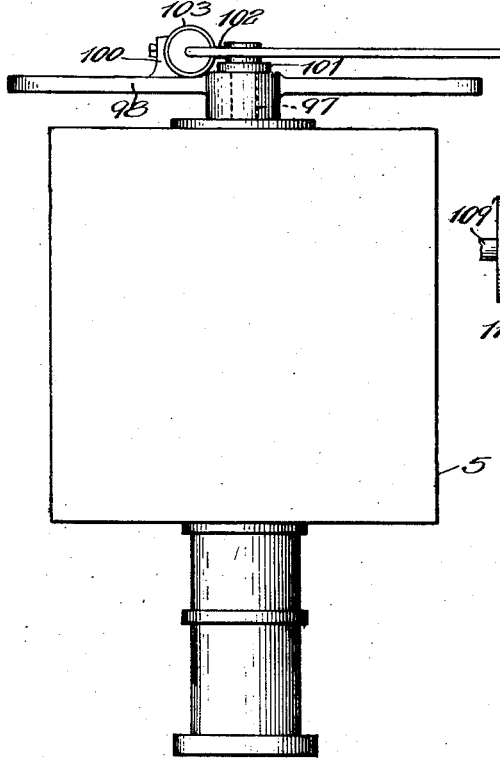
Figure 12 is a side elevational view of one form of camera.

This direction indicating instrument 60 is illustrated in detail in Figures 7, 8 and 9 and comprises an escutcheon plate 61, which is mounted upon the instrument board and which has a frame 62 integral therewith and extending through an opening in the instrument board, as shown, so that the escutcheon plate may lie flush upon the board and the mechanism of the instrument be disposed in the rear of the board. The escutcheon plate has an elongated opening 63, which is covered by translucent material, such as a strip of celluloid 64, held in place by a rim 65 which is screwed to the escutcheon plate by screws 66. The frame 62 mounts 19 incandescent lamps 70, set in horizontal series and preferably equidistantly spaced. These lamps are conveniently of the type of telephone switchboard lamps, which are well known, and each of them is set between the springs of a so-called "lamp jack," well known in the telephone art. The contact springs are indicated at 67—67, being held in place upon an insulating strip 68. In Figure 8, the upper row of springs is shown, a similar row of springs being provided on the other side. The lamps themselves carry metallic contacts with which the contact springs make electrical engagement. The lamps are exposed through the openings 63, as illustrated in Figure 7, the center lamp occupying an exactly central position which is indicated by the center line 69 painted or otherwise marked on the celluloid strip 64. All of the contact springs on the top side are connected together by a common wire 71, and the bottom contact springs are connected independently and respectively with the conductors 57 of the cable 58, which enters the end of the sheet metal cover 72 through a bushing 73. Figure 12 illustrates diagrammatically the circuit connections between the pilot directing sight 3 and the direction indicating instrument 60 on the pilot's instrument board. As will be observed from this figure, the contact members 54 are connected independently and respectively with the conductors 57 of the cable 58. The brush 53 is, by its mounting, grounded to the instrument, as is also the terminal 74 of the switch 12, this grounded connection being indicated by the conductor 75. The other terminal 76 of the switch 12 is connected by means of conductor 77 with one pole of the battery 78, the other pole of which is connected by means of a conductor 79 with the wire 80, which has connection with the common wire 71 already referred to. The several conductors 57 of the cable 58 are connected to the lamp contact springs in such order that #1 contact in the commutator housing corresponds with #1 lamp, #2 contact corresponds with #2 lamp and so on. #10 is the center lamp as is also #10 contact the center contact, this contact being the special contact A already referred to. Also connecting with the wire 79, which leads from the battery 78, is a wire 81 leading to the automatic shutter mechanism of the camera 5, which I shall now describe.

The camera 5 is mounted in definite relation to the keel of the airplane, being preferably located centrally in the lower part of the fuselage and having an exposure opening 82 extending through the bottom of the fuselage. I contemplate, as within the scope of the present invention the use of a motion picture camera, a single exposure camera, a series picture type, or any other preferred type. I prefer, however, to employ a particular construction of automatic camera which embodies certain characteristics of each of the preceding types of camera, that is to say, it has means for making a succession of exposures. As each exposure is made the camera is arranged to automatically substitute a new photographic surface, (conveniently in the form of a roll film) this being preferably accomplished by a small electric motor which advances the film after each exposure and thus has a new photographic surface in position for the next succeeding exposure. I shall not refer to the construction of this camera in detail, as the above brief description will suffice to illustrate its operating function in relation to the present invention.

The shutter mechanism of the camera is electrically operated through the energization of a solenoid 83 (Figure 12), which may function to operate the shutter directly or by clutching the electric motor, (which runs constantly during the operation of the camera,) to suitable shutter operating mechanism. The solenoid 83 is adapted to be energized through a circuit consisting of wires 81 and 85, this circuit being adapted to be closed either manually for single exposures, or automatically for successive series exposures, as in mosaic mapping. Referring particularly to these circuit connections, as shown in Figure 3, the wire 85 is extended up to the aerial directing and camera control device 3 at the bow cockpit, where it is led through a bushing 86 in the rear wall of the commutator housing 31, (Figure 14) and is thence extended up through the hollow stem 32 to the object-following sight bar 45. Here the wire 85 is extended out through the side of the stem 32 to have electrical connection with a series of electrical contacts 87, which are suitably mounted in quadrant relation on a segment of insulation 88. The segment 88 is screwed or otherwise fastened to an arcuate flange 89, which projects downwardly from the pivotal center of the sight bar 45. The contacts 87 are riveted or screwed to the body of the segment 88, and have projecting head 92' on the rear side of the segment plate 88 which engage over a metal strip 92 (Figure 4). This strip connects all of the contacts together and has connection with the wire 85. These contacts are disposed in a quarter circle concentrically about the pivotal center 44 of the sight bar 45; and arranged to engage with these contacts is a small contact brush 93 on the sight bar 45, which is adapted to engage each contact 87 successively as the sight bar is revolved from a horizontal to a vertical position. The brush 93 consists of a short section of spring metal which is adjustably mounted directly on the sight bar 45, and is thus grounded to the frame of the device. The contact brush 93 is mounted so as to be longitudinally shiftable on the sight bar 45, in order that it may be retracted out of the path of the contacts 87, when it is desired to oscillate the sight bar and not close the shutter circuit of the camera. To this end the brush is mounted on a pin 94 (Figure 5), which extends through a longitudinal slot 94' in the bar 45 and carries a small button 95 on the front of the bar, by which the contact brush is retracted. The brush is held in its operative and inoperative positions by transverse notches 95' in the back of the sight bar 45, into which snaps a detent tail on the inner end of the spring brush 93. Assuming that the brush has been shifted out into its operative position, it will be apparent that as the sight bar 45 is revolved down from a substantially horizontal position, the brush 93 will successively engage each of the contacts 87, thereby completing the circuit through the frame of the device and the wires 81 and 85 and exposing the camera intermittently. The effect of this intermittent exposure of the camera and the calculated frequency of the exposures I shall describe in detail in the description of the entire operation of the invention, to be hereinafter referred to.

Figure 10:
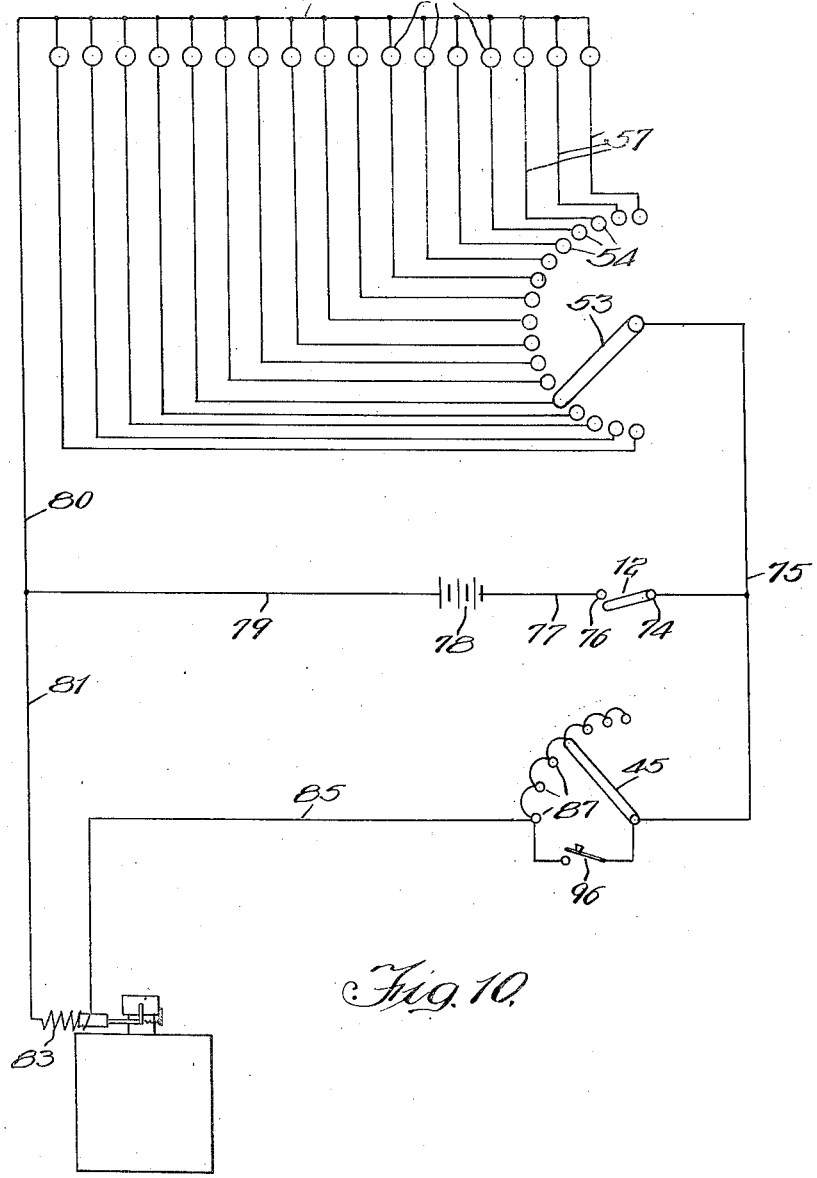
Figure 10 is a diagrammatic view of the electrical circuit connections of the observer's directing and control instrument with the camera and with the pilot's direction indicating instrument.

It will be noted from Figure 10, that these camera control contacts 87 are bridged by a push button 96 or other suitable circuit closing switch. One terminal of the switch is connected to the grounded frame of the device 3 and the other terminal is connected to the wire 85. The switch is mounted in convenient position adjacent the directing and control device 3 for operation by the observer when he desires to make a single exposure.

Figure 11:
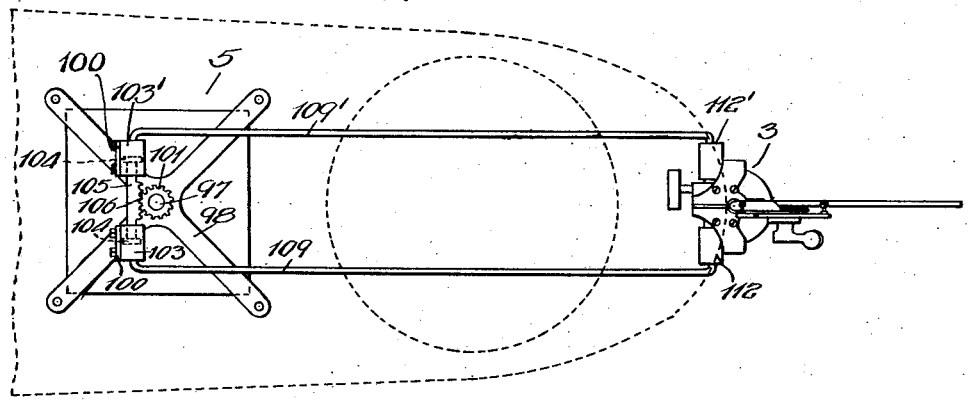
Figure 11 is a plan view illustrating diagrammatically the further connections between the camera control device and the camera itself.

As I have previously described, it is desirable, and in fact essential for mosaic mapping and similar photography, to have the camera maintained in a definite angular relation to the course of travel over the ground so that objects photographed will have the proper angular position relative to the shape and dimensions of the picture. The reason for this may be illustrated as follows: Assume that it is desired to take a series of mosiac or overlapping photographs of a road or other straight-line object, and that there is a considerable side wind blowing across the required line of travel above the object. To maintain a course of flight on a straight line directly above the object, the aircraft is compelled to nose into this wind to a greater or less extent, which of course, in the case of a camera fixedly mounted on the body of the aircraft, disposes the camera in angular relation to the road or other straight-line object to be photographed. Consequently, each photograph will illustrate the road or other line object extending diagonally across the picture instead of longitudinally from end to end, with the consequence that it is impossible to line up the several photographs with the successive portions of the object in contiguous alignment without great waste, if indeed it is at all possible. I have overcome this difficulty by pivotally supporting the camera 5 and arranging it to swing synchronously with the angular adjustment of the ground direction bar 37, so that the center line of the field in the camera 5 is maintained parallel to the actual course of travel at all times, irrespective of the angular position of the machine. As will be noted from Figures 11 and 12, the camera 5 is pivotally mounted on a vertical axis consisting of a spindle 97, which is aligned vertically with the shutter opening, and which has bearing support in a spider hub 98 rigidly bolted to the framework of the fuselage. The spindle 97 is extended through the spider hub 98 and on its upper end is provided with a collar 101 which supports the spindle and carries a segmental spur gear 102. Supported upon a pair of lateral brackets 100, projecting from the arms of the spider hub 98 is a pair of small cylinders 103—103', which are spaced equidistantly from the spindle 97 and have their open ends in opposed relation. Reciprocating in the cylinders 103 are pistons 104, which are connected by a piston rod 105, on the side of which is formed a toothed rack 106. The rack 106 meshes with the segmental gear 102 of the spindle 97, and is held in meshed relation therewith by flanges which are formed integral with the rack and which overlie each side of the segmental gear 102, thereby preventing the rack 106 from swinging down out of mesh with the gear 102. The heads of the cylinders 103 are provided with port openings into which thread fluid pipes 109—109'. The pipes 109 preferably consist of flexible metal tubing so as to facilitate the laying of these pipes around in the fuselage. These pipes extend up to the aerial directing and camera control device 3, where they have connection with port openings in the heads of two small cylinders 112—112'. These cylinders are of the same size as the cylinders 103, which control the camera, and are rigidly mounted upon bracket extensions 113 projecting from the yoke 18 (Figure 2). Reciprocating in the cylinders 112—112' are pistons 115, which are connected by an intermediate piston rod 116 (Figures 3 and 13). The piston rod 116 is formed with a rack 117 which meshes with a segmental gear 118, formed integrally with the outer sleeve 27, which swings the ground direction or drift bar 37. The rack 117 is also provided with flanges 119, similar to the flanges on the rack 105, the flanges 119 embracing the segmental gear 118, and retaining the two gears in mesh. The two pairs of cylinders 103—103' and 112—112' and the pipe line 109—109' are adapted to be filled with an incompressible liquid, preferably oil, which is inserted through filler openings in the tops of the cylinders, which openings are closed by screws 121. The radius of the segmental gear 118 is identical with that of the segmental gear 102 so that angular motion of the gear 118 will—through the medium of the pistons 104—104' and 115—115' and oil columns—produce an identical degree of angular motion of the segmental gear 102. It will be observed that as a result of the foregoing arrangement the camera 5 is compelled to swing synchronously with the swinging motion of the drift bar 37, by reason of the incompressible action of the two columns of liquid connecting the cylinders 103 and 112, and 103' and 112' respectively, so that the horizontal axis of the camera will always lie parallel to the ground direction bar 37. The flexibility of the oil pipes 109—109' permits the universal adjustment of the directing and control device 3 about its ball and socket joint without hindrance.

The operation is as follows:

Assuming that the craft is flying in the general direction of the objective to be photographed, the first duty of the observer is to keep the ground direction bar 37 lined up or parallel with the actual course of flight of the craft over the ground. This is readily effected by adjusting the angular position of the bar until all objects on the ground moving under the direction bar remain parallel in their relative travel along the edge of the ground direction bar, from end to end thereof. The observer is aided in doing this by sighting along the edge of the ground direction bar through the sights 46 and 47. Upon sighting the object to be photographed the observer trains the sight bar 45 upon the object and closes the switch 12. Immediately one lamp or two adjacent lamps in the pilot directing instrument 60 will light, indicating the position of the object relative to the line of flight. The pilot then "steers into the light", that is he steers toward the side of the center line 69 on which the lamp is lighted. As he does so, the observer makes any correction of the ground direction bar 37 which may be necessary (as for instance, because of slightly different newly acquired line of flight relative to the wind) and the observer continues to keep the sight bar 45 trained upon the object. As this action proceeds, the pilot in steering brings his craft into such position that the sight bar 45 will lie parallel to the ground direction bar 37. Since the commutator housing 31 swings with the ground direction bar 37, and since the center contact is then engaged by the brush which swings with the sight bar 45, the center lamp, and the center lamp alone, is then lighted. This means that the craft is heading directly for the object, the ground direction bar being parallel to the flight, the sight bar being sighted on the objective, and the two being parallel. In other words, the object has been brought into the plane of actual flight and from that moment on it is a matter of keeping the plane in line approaching the object or over a continuous object, such as a road, stream or shore line. If the road or line changes, the sight bar, being kept trained upon it, shows the change to the pilot, who immediately corrects for it. In the event that there is a wind blowing across the line of flight it will be apparent that the ground direction bar 37 will not lie in line with the keel of the craft, but will be disposed to the leeward, indicating the actual direction of travel over the ground, for the reason that the craft must be nosed into the wind at a slight angle to overcome drift. This is of no concern to the pilot, for the reason that he pays no attention to his direction of flight, nor to the course of winds other than to steer in such a manner as to keep the light exactly on the center line 69. He need not be concerned with drift, for he follows the same rule whether the craft is drifting or not drifting.

The swinging of the ground direction bar 37 operates upon the camera 5 through the medium of the fluid transmission system to retain the longitudinal axis of the camera parallel to the line of travel over the ground. Hence the camera is always maintained in accurate alignment with the course of travel over the ground so that the object will always be properly disposed on the photograph. It is necessary to keep the aerial directing and camera control device 3 level, both fore-and-aft and athwartships during this sighting operation, which is made possible by the provision of the ball and socket joint 15—17. This ball and socket joint is adjusted to have a considerable degree of friction, this friction being such that the sight will remain wherever set, but will still be capable of ready correction by hand. The flexible pipe lines 109—109' permit of this correction without affecting the synchronous relation between the ground direction bar 37 and the camera.

Referring now to the operation of the camera, assume that the observer is desirous of taking one or more single exposures of an object or objects on the ground. He keeps following the object with the sight bar 45 until the craft is directly above the object, as is denoted by the line sight intersecting the bead 37' on the ground direction bar 37, or until the craft is at the angle desired for taking the photograph, whereupon the observer trips the shutter by closing the push button 96. It is understood, of course, that in taking such photographs the contact button 95 is in retracted position so that the camera control circuit will not be energized by the declination of the sight bar 45. Assume now that the observer desires to take a series of pictures in definitely spaced, co-extensive relation for mosaic mapping, road photography or the like, and assume, for illustration, that he desires to photograph a stretch of road between two given points. He first maneuvers the craft into line corresponding to the direction of the road by manipulating the sight bar 45. After the craft has been brought into line with the road (the ground direction bar 37 being kept parallel to the course of flight), the sight bar 45 is brought to bear upon any suitable aiming point, such as a tree, building or the like, located substantially at the end of the stretch of road which is to be photographed. The contact button 95 is then shifted along the sight bar to bring the contact 95 into alignment with the arcuate series of contacts 87. The sight bar 45 is held on the aiming point or object without interruption as the craft approaches the same; from which it will follow that the sight bar will necessarily be declined more and more as the craft approaches the aiming point until it is directly above the aiming point, when the sight bar will be in a substantially vertical position. The gradual declination of the sight bar 45, as above noted brings the contact brush 93 into engagement successively with each of the contacts 87, thereby making and breaking the camera control circuit intermittently and exposing the camera with a predetermined frequency. It will be noted from Figures 3 and 4 that the spacing interval between the contacts 87 increases from the horizontal toward the vertical, this spacing interval increasing in accordance with a trigonometrical function of the angle defined between the horizontal and the line of sight from the aircraft to the aiming point. The theory upon which this variable spacing of the contacts 87 is based is diagrammatically illustrated in Figure 15, in which $a$ designates the airplane flying at a given height, $f$ the field of the camera, and $p$ the aiming point. The spacing of the contacts is computed with a view to having the camera control circuit energized at each of the points $r$, $s$, $t$, $u$, $v$, $w$, etc., which are so spaced as to insure a predetermined degree of overlap $o$ between successive pictures. The line of sight from each of these points to the aiming point $p$ defines an angle with the horizontal which increases successively with each successive point $r$, $s$, $t$, $u$, etc. This increase of angle follows a known trigonometrical function, and by merely spacing the contact points 87 in accordance with the variation of this trigonometrical function the energization of the camera control circuit at these points $r$, $s$, $t$, etc. is obtained. It should be noted that this method of automatically timing the exposure of the camera is entirely independent of the speed of the aircraft, and consequently the successive exposures are always made with the same interval of distance between them irrespective of headwinds, tailwinds or any other factors influencing the speed of the aircraft.

For insuring the same degree of overlap $o$ at different altitudes, the distance interval between the points of exposure may be maintained as before, and the width of field $f$ narrowed or widened by focal adjustment of the camera in order to include a larger or smaller area of ground. Or, the distance interval between the points of exposure may be varied, either conjointly with adjustments in the width of field $f$ or without any such adjustments in the width of field. The width of field $f$ is a factor which should be capable of adjustment at any time independently of other conditions and it is therefore desirable that the means provided for adjusting the distance interval between points of exposure shall be capable of operation independently of and without interference with adjustments in the width of field $f$. To this end I contemplate providing an extensive series of contacts 87', as shown in Figure 6, which are all spaced in accordance with the variable function previously described. This series of contacts 87' is mounted on an arcuate disc member of insulation 88', which is pivotally supported on the pivot pin 44. This arcuate member may be adjustably swung about the pivot 44 in order to bring any desired group of the contacts 87' into the operating range of the sight bar 45. The contacts are held in any selected position by a detent pin 124, which is guided in lugs 125 on the stem 32, and which is pressed by a spring 126 into notches 127 cut in the periphery of the member 88'. The contacts 87' extend from a very close spacing at one end of the disc member 88' to a very distant spacing at the other end of the disc member; and it will be apparent that by adjusting the angular position of the disc member 88' any desired group of contacts, corresponding to a definite spacing interval between pictures, can be brought into the operating range of the sight bar 45. The disc member 88' may be marked off with an altitude scale, or with a scale denoting width of field, or with indicia representing the combined values of altitude and width of field, so that the desired exposure interval corresponding to these known conditions can be readily set off.

I claim:

1. In aerial photography, a camera, a sighting member, and means operatively connected with said sighting member for exposing said camera.

2. In aerial photography, the combination of an air craft having a camera, a sighting member on said aircraft, adapted to be directed upon an object, and means cooperating with said sighting member for determining the instant of exposure of said camera.

3. In aerial photography, the combination of an air craft having a camera mounted thereon, a sighting member adapted to be directed at an object on the terrain, and means controlled by the position of said sighting member for automatically exposing said camera.

4. In aerial photography the combination of an aircraft having a camera mounted thereon, a pivoted sighting member on said aircraft, means for exposing said camera at a frequency determined by the angular motion of said sighting member, and means for adjusting said latter means for different altitudes of flight.

5. In aerial photography, the combination of an aircraft having a camera mounted thereon, a sighting member for controlling said camera, said sighting member being pivotally mounted on said aircraft and being adapted to be trained upon an aiming point, means for automatically exposing said camera at a frequency determined by the angular motion of said sighting member, and means for adjusting said automatic means for different widths of field of said camera.

6. In aerial photography, the combination of an aircraft having a camera mounted thereon, a sighting member pivoted for vertical oscillation, said sighting member being adapted to be trained upon an aiming point, automatic means for exposing said camera at a frequency determined by the angular declination of said sighting member, and means for adjusting said automatic means for varying the frequency of exposure in accordance with changes in altitude or adjustments in the width of field of said camera.

7. In aerial photography, the combination of an aircraft, an aerial camera, an electric circuit operable to expose said camera, a sighting member and means operable by the motion of said sighting member for intermittently energizing said electric circuit.

8. In aerial photography, the combination of an aircraft, an aerial camera having a shutter, an electric circuit controlling said shutter, a pivoted sighting member adapted to be trained upon an aiming point, a series of contacts adapted to be intermittently engaged by the angular motion of said sighting member, said contacts controlling said electric circuit.

In witness whereof, I hereunto subscribe my name this 31st day of January, 1920.

ARTHUR H. BOETTCHER.